United States Patent [19]

Kanai et al.

[11] Patent Number: 4,846,046

[45] Date of Patent: Jul. 11, 1989

[54] HYDRAULIC DRIVE CIRCUIT SYSTEM

[75] Inventors: Takashi Kanai, Kashiwa; Masami Ochiai, Chiyoda; Morio Oshina, Chiyoda; Mitsuo Sonoda, Chiyoda; Koji Nozaki, Chiyoda, all of Japan

[73] Assignee: Hitachi Construction Machinery Co., Ltd., Tokyo, Japan

[21] Appl. No.: 166,017

[22] Filed: Mar. 9, 1988

[30] Foreign Application Priority Data

Mar. 9, 1987 [JP] Japan ................. 62-52010

[51] Int. Cl.[4] ........................... F04D 49/00
[52] U.S. Cl. ..................... 91/506; 60/444; 60/494; 417/216
[58] Field of Search .......... 60/443, 444, 494; 417/216, 217, 222; 91/506

[56] References Cited

U.S. PATENT DOCUMENTS

| | | | |
|---|---|---|---|
| 3,153,900 | 10/1964 | Pigeroulet | 60/433 |
| 3,214,911 | 11/1965 | Kempson | 60/433 X |
| 3,986,358 | 10/1976 | Hoffmann | 60/444 X |
| 4,080,850 | 3/1978 | Bubula et al. | |
| 4,193,323 | 3/1980 | Bubula et al. | |
| 4,203,293 | 5/1980 | Bubula et al. | |
| 4,400,935 | 8/1983 | Louis | 60/444 X |
| 4,400,939 | 8/1983 | Moranduzzo et al. | 60/444 X |
| 4,461,147 | 7/1984 | Myers | 60/444 X |
| 4,510,750 | 4/1985 | Izumi et al. | 60/444 X |
| 4,637,781 | 1/1987 | Akiyama et al. | 417/216 |
| 4,745,746 | 5/1988 | Geringer | 417/216 |

*Primary Examiner*—Leonard E. Smith
*Attorney, Agent, or Firm*—Oblon, Spivak, McClelland, Maier & Neustadt

[57] ABSTRACT

A hydraulic drive circuit system is equipped with an accelerator pedal and an accelerator lever for respectively instructing target revolution numbers for an engine, a link plate for selecting greater one of the instruction values, and a linkage and a switch for controlling valves respectively so as to close the flow passage of a line interposed between a charge pump and a low pressure line irrespective of the instruction value of the accelerator pedal when the accelerator lever has not been controlled but for controlling the valves so as to restrict the flow passage of the line in accordance with the instruction value of the accelerator pedal when the accelerator lever has been controlled.

7 Claims, 7 Drawing Sheets

HYDRAULIC DRIVE CIRCUIT SYSTEM

BACKGROUND OF THE INVENTION (1) Field of the Invention

This invention relates to a hydraulic drive circuit system, and particularly to a hydraulic drive circuit system suitable for a construction machine, such as a wheel loader or tractor, or a like apparatus in which at least two hydraulic pumps are commonly driven by a single engine, with the pumps performing different operations respectively.

(2) Description of the Related Art

A hydraulic drive circuit system of a wheel loader or tractor is generally provided with separate hydraulic pumps, one for driving the wheels and the other for a front attachment, and both hydraulic pumps are commonly driven by a single engine. The hydraulic pump for the wheels is of the variable displacement type, and is controlled in such a way that its revolution number and its delivery rate per revolution are both increased as the revolution number of the engine increases in accordance with the stroke of an accelerator pedal.

In a hydraulic machine in which such a control is performed, the running speed of the machine naturally increases when the accelerator pedal is depressed to increase the revolution number of the engine in order to increase the revolutionary speed of an actuator for a front attachment (for example, to increase the working speed of a bucket). In other words, the correlation between the working speed of the front attachment and the running speed is substantially fixed. Because of this combination of working speed and running speed, the matching of the two may become unsuitable, depending on the type of work, whereby work efficiency could be impaired.

With the foregoing in view, a hydraulic drive circuit system designed to decrease the running speed while at the same time increasing the working speed has been proposed for wheel loaders or tractors. This hydraulic drive circuit system is provided with a pedal-operated control means called an "inching pedal" in addition to an accelerator pedal, whereby deceleration of the running speed is also permitted by the control means.

The above hydraulic drive circuit system is equipped with a hydraulic actuator for actuating a displacement varying mechanism, for example, a swash plate of a hydraulic pump for wheels, a working fluid feeding circuit for feeding a working fluid of a pressure produced responsive to the revolution number of an engine to the hydraulic actuator, and an inching valve connected to a communicating line interposed between the working fluid feeding circuit and a low pressure source, the opening of said inching valve being variable to control the degree of actuation of the hydraulic actuator. The inching valve is operated by the inching pedal mentioned above. The working fluid feeding circuit is composed, for example, of a charge pump driven by the engine to feed a charge pressure to a closed circuit formed of the hydraulic pump for the wheels, a restrictor provided with a delivery line from the charging pump, and a pair of lines connecting both the upstream and the downstream side of the restrictor to the hydraulic actuator. In this case, the above-mentioned communicating line is interposed between the paired lines. Also connected to the paired lines is a directional control valve as a working direction setting means for controlling the operating direction of the hydraulic actuator.

When the accelerator pedal is depressed in such a system, the revolution number of the engine increases and the delivery rate of the hydraulic pump for the front attachment also increases. The working speed of the front attachment hence becomes faster. At the same time, the revolution number of the hydraulic pump for the wheels also increases. If the directional control valve has been changed over to the forward or reverse position from the neutral position, a differential pressure occurs between the upstream side and downstream side of the restrictor with respect to the working fluid delivered from the charge pump acts on the hydraulic actuator by way of the paired lines, so that the hydraulic actuator is operated. The tilting of the swash plate hence increases, so that the delivery rate per revolution of the hydraulic pump for the wheels increases. As a consequence, the delivery rate of the hydraulic pump increases in a quadratic curve as a function of the revolution number and the tilting of the swash plate. When the operation of the hydraulic actuator reaches the maximum degree (namely, when the tilting of the swash plate reaches the maximum), the delivery rate per revolution does not increase any further, and the delivery rate of the hydraulic pump changes as a function of only the revolution number of the engine and thus increases linearly.

When the running speed has increased beyond necessity in a depressed state of the accelerator pedal and its matching with the work by the front attachment has been impaired, the inching pedal which is normally closed is depressed to operate the inching valve. As a result, the inching valve is opened in proportion to the degree of the depression of the inching pedal; the working fluid on the higher pressure side of the paired lines is allowed to flow to the lower pressure side, and the tilting of the swash plate is therefore reduced in order to slow down the running speed. It is accordingly possible to stop the vehicle or to slow it down to a desired speed by controlling the degree of operation of the hydraulic actuator through an operation of the inching pedal in the above-described manner.

As has been described above, the conventional system requires an operator to depress not only the accelerator pedal to control the revolution speed of the engine, but also the inching pedal to control the running speed so that the most suitable matching point is found between the working speed and running speed. He is required to perform the work in this state. However, this manner of operation requires depressing the accelerator pedal and the inching pedal at the same time, and also controlling the strokes in a correlated relation. The operator is therefore hard put to maintain his body's stability, and is tired unnecessarily.

The operator is also required to control a working lever to operate the front attachment or the like in the above state. It is hence difficult to perform delicate work. If his foot should slip off the inching pedal in the course of work, the vehicle runs at an unexpected speed. This is very dangerous. Even when the vehicle is stopped and work is performed at a constant engine revolution number, the operator is required to continuously depress the accelerator pedal and inching pedal; his work load is not reduced at all.

With a view toward easily enabling low-speed running suited for combined operations without posing an extra load on the operator, the present applicant has already proposed in U.S. patent application Ser. No. 07/127,275 to provide an accelerator lever as a means for setting a target revolution number for an engine, a means for guiding a working fluid from a working fluid feeding means to a low-pressure circuit in relation to the stroke of the accelerator lever so as to limit the maximum pressure of the working fluid, and a means for selectively actuating the operation of the maximum pressure limiting means in a hydraulic drive circuit system of the above-described sort.

Once the maximum pressure limiting means is activated in the proposed system, the pressure increase of the working fluid from the working fluid feeding means is limited; for example, when the accelerator lever exceeds a predetermined stroke. Even when the stroke of the accelerator lever is further increased, the degree of actuation of the hydraulic actuator does not increase, and the tilting of the swash plate does not increase correspondingly. The delivery rate of the hydraulic pump therefore increases only when the revolution number of the engine increases. After the accelerator lever has reached the predetermined stroke, the increment of the delivery rate of the hydraulic pump decreases, hence reducing the increment of the running speed. Control of the acceleration lever alone therefore allows the operator to govern the running speed within a reduced speed range and the working speed in accelerated speed ranges.

However, the proposed system cannot achieve high-speed running when the maximum pressure setting means has been actuated to set the running speed in a low speed mode. Since the running speed is controlled by the accelerator lever and by changing at least the revolution number of the engine, the control of the accelerator lever also changes the working speed of the front attachment as a result of the change in the engine's revolution. It is hence impossible to control the running speed independently of the working speed of the front attachment. As a consequence, the proposed system cannot perform work in which the control of the running speed is required in a wide speed range of from a low speed to a high speed concurrently with, before, or after the operation of the attachment; or in which the running speed has to be controlled independently of the working speed of the front attachment in the combined operations of both front attachment and running.

For example, work by a hydraulic machine such as a wheel loader or tractor includes operations where digging is performed by utilizing the running function, and then the dug-up earth is carried away to another place. In such operations, it is convenient from the standpoint of work ease to drive the front attachment under high power or at a high speed while fine-adjusting the running speed at low speeds. As for work efficiency, it is more convenient to perform the carrying of the earth at a running speed as high as feasible. While conducting such an operation, it is possible to drive the front attachment under high power or at a high speed, and to control the running speed at a low speed, so long as the maximum pressure limiting means is actuated as mentioned above. The carrying of the earth cannot be performed at a sufficiently high speed after the digging, since the running speed is set in the low-speed mode. Since the control of the running speed also changes the working speed of the front attachment in the combined operations of the running and the front attachment, it is still impossible to control the running speed at will and hence difficult to ensure good operability.

SUMMARY OF THE INVENTION

An object of this invention is to provide a hydraulic drive circuit system having excellent operability so that the system permits delicate work, can prevent any unexpected running of a vehicle, and can also reduce the operator's work load.

Another object of this invention is to provide a hydraulic drive circuit system which permits the control of one operation in a wide speed range of from a low speed to a high speed independently of any other operation or operations.

In one aspect of this invention, there is thus provided a hydraulic drive circuit system equipped with an engine; a plurality of hydraulic pumps adapted to be driven by the engine (one of said hydraulic pumps being a variable displacement hydraulic pump provided with a displacement varying mechanism); a hydraulic actuator for actuating the displacement varying mechanism of the variable displacement hydraulic pump; a working fluid feeding means for feeding the hydraulic actuator with a working fluid of a pressure corresponding to the revolution number of the engine; and a valve means connected to a line, which is interposed between the working fluid feeding means and a low pressure source, and adapted to vary the flow passage area of the line to control the degree of actuation of the hydraulic actuator, which comprises:

first and second instruction means for respectively instructing target revolution numbers for the engine;

an instruction value selecting means for selecting the greater one of the instruction values from the first and second instruction means; and a control means for controlling the valve means so as to close the flow passage of the line irrespective of the instruction value of the first instruction means when the second instructing means has not been controlled but for controlling the valve means so as to restrict the flow passage of the line in accordance with the instruction value of the first instructing means when the second instructing means has been controlled.

When the first instructing means is controlled in a non-controlled state of the second instructing means, the instruction value selecting means obviously selects the instruction value instructed by the first instructing means so as to rotate the engine at a revolution number corresponding to the instruction value. Since the second instructing means is in the non-controlled state at this time, the control means controls the valve means in such a way that the flow passage of the line is closed. As a result, the revolution number of the variable displacement hydraulic pump increases in accordance with the revolution number of the hydraulic pump and when the operating direction setting means has been operated, the hydraulic actuator is also operated to drive the swash plate. The delivery rate per revolution of the hydraulic pump hence increases. Accordingly, the delivery rate of the hydraulic pump increases by increases in the engine's revolution number and by the tilting of the swash plate.

When the second instructing means is controlled in a non-controlled state of the first instructing means, the instruction value selecting means selects the instruction value instructed by the second instructing means so as to rotate the engine at a revolution number corresponding to the instruction value. Since the first instructing means is in the non-controlled state at this time, the control means controls the valve means in such a way that the restriction of the flow passage of the line is zero; namely, the flow passage is fully opened. Even when the working fluid is supplied from the working fluid feeding means, the working fluid is hence caused to flow in its entirety to the low pressure source through the line. The hydraulic actuator is not operated but maintained at the neutral position. As a result, the delivery rate from the variable displacement hydraulic pump is reduced to zero and only the operations by the other hydraulic pumps can be performed.

When the first and second instructing means are both controlled, the instruction value selecting means selects the greater one of the instruction values of the instruction means and outputs the same to the engine so that the engine is rotated at a revolution number corresponding to the greater instruction value. Since the second instruction means is in the controlled state at this time, the control means controls the valve means in such a way that the flow passage of the line is restricted in accordance with the instruction value of the first instruction means. Accordingly, a portion of the working fluid to be supplied to the hydraulic actuator is caused to flow to the low pressure source in accordance with the degree of the restriction, namely, the instruction value of the first instructing means, whereby the degree of operation of the hydraulic actuator is controlled. It is hence possible to control the delivery rate of the variable displacement hydraulic pump by the first instructing means independently of the revolution number of the engine when the first instructing means is controlled in a range smaller than the instruction value of the second instructing means. Provided that the second instructing means is maintained at a constant level, the delivery rate of the hydraulic pump can be controlled at a constant revolution number of the engine. When the instruction value by the first instructing means becomes greater than the instruction value of the second instructing means, the revolution number of the engine increases in accordance with the instruction value of the first instructing means so that the delivery rate of the hydraulic pump increases by increases in the revolution number of the engine and by the tilting of the swash plate.

While performing one work by the second instructing means, other work can be performed independently by the first instructing means as described above.

The above valve means can be constructed by a flow rate control valve and an on-off valve connected in series to the line. The control means may be composed of a first control means for restricting the opening of the flow rate control valve in accordance with the instruction value of the first instructing means to restrict the flow passage of the line, and a second control means for closing the on-off valve when the instruction value of the second instructing means is zero, but for opening the on-off valve when the instruction value of the second instructing means is other than 0.

The valve means may be composed of a servo valve which is equipped with a spool and a sleeve. The servo valve takes a closed state when the stroke of the spool is at least the same as the stroke of the sleeve but its opening increases in accordance with the difference in stroke between the sleeve and spool when the stroke of the sleeve is greater than the stroke of the spool. The control means may comprise a first control means for varying the stroke of the spool of the servo valve in accordance with the instruction value of the first instructing means, and a second control means for varying the stroke of the sleeve of the servo valve in accordance with the instruction value of the second instructing means.

Further, the valve means may also be constructed of a solenoid-controlled proportional valve. The control means may comprise a means for discriminating whether the instruction value of the second instructing means is zero or not, and a means for closing the solenoid-controlled valve irrespective of the instruction value of the first instructing means when the instruction value of the second instruction means has been found to be zero by the discriminating means, but for controlling the opening of the solenoid-controlled proportional valve in accordance with the instruction value of the first instructing means when the instruction value of the second instructing means has been found to be other than zero by the discriminating means.

The instruction value selecting means may be composed mechanically of a link plate defining a first slot to which an operating end of the first instructing means is connected, and a second slot to which an operating end of the second instructing means is connected; or it may be constructed of a means for comparing the instruction value of the first instructing means and the instruction value of the second instructing means to determine which instruction value is greater, and a means for outputting the greater instruction value oh the basis of the comparison by the comparing means.

The second instructing means may preferably have a means for holding the second instructing means at a controlled position.

DESCRIPTION OF THE PREFERRED EMBODIMENTS

Figure 1:
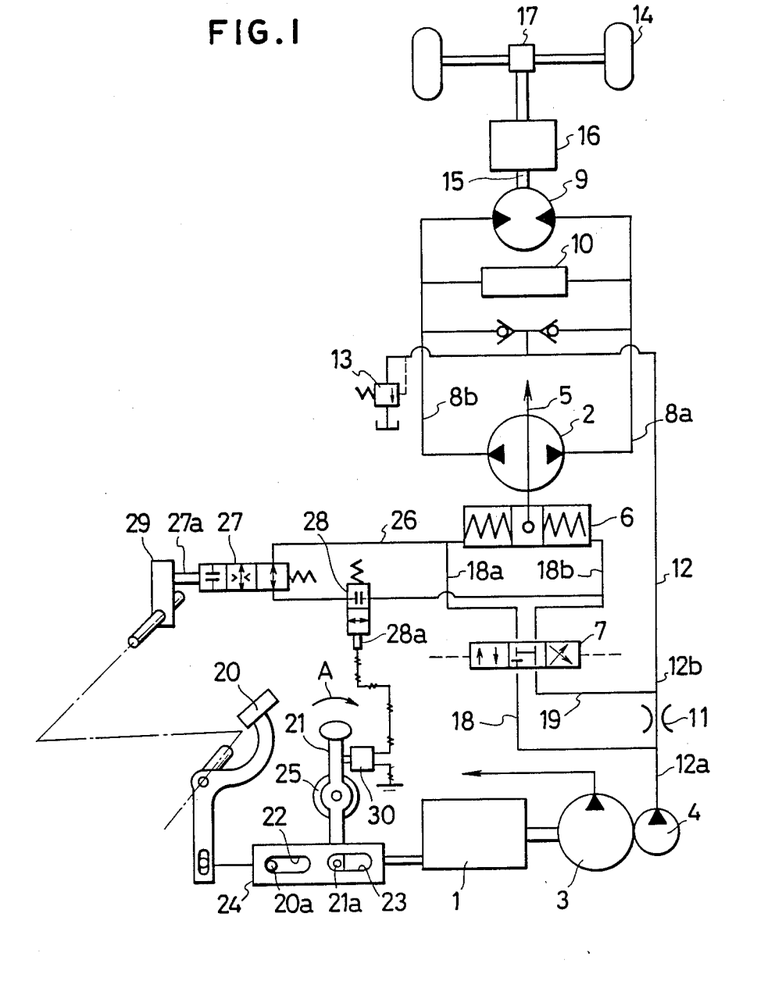
FIG. 1 is a circuit diagram of a hydraulic drive circuit system according to a first embodiment of this invention.

In FIG. 1, the hydraulic drive circuit system according to the first embodiment of this invention is equipped with a single engine 1; three hydraulic pumps adapted to be driven by the engine 1, namely, a variable displacement hydraulic pump 2 for running, a fixed displacement hydraulic pump 3 for driving a front attachment (not shown) to perform work and a charge pump 4 for feeding a charge pressure to a below-described closed circuit in which the variable displacement hydraulic pump 2 is provided; a hydraulic actuator 6 for operating a displacement varying mechanism 5 (hereinafter called "swash plate") of the variable displacement hydraulic pump 2; and a directional control valve 7 as an operating direction setting means for controlling the direction of operation of the actuator 6.

The variable displacement hydraulic pump 2 is a double-delivery variable displacement pump. The variable displacement hydraulic pump 2 is connected to a hydraulic motor 9 via main lines 8a,8b and constitutes a closed circuit together with an auxiliary equipment 10. A hydraulic pressure is supplied from the charge pump 4 through a line 12 which is provided with a restrictor 11. Here, the charge pressure to be supplied to the closed circuit is maintained at a preset pressure by the restrictor 11 and a relief valve 13 provided with the line 12. On the other hand, the hydraulic motor 9 serves to drive wheels 14. Drive power is transmitted from an output shaft 15 of the hydraulic motor 9 to the wheels 14 by way of a mechanical transmission 16 having plural shift positions, and a differential gear 17, whereby the vehicle is caused to run.

The direction and flow rate of delivery of the variable displacement hydraulic pump 2 are controlled by the swash plate 5. The hydraulic actuator 6 for operating the swash plate 5 is connected to an upstream-side line section 12a and a downstream-side line section 12b of the line 12 relative to the restrictor 11 through paired lines 18,19, the above-described directional control valve 7 and paired lines 18a,18b, and takes a position corresponding to the pressure of a working fluid supplied from the charge pump 4 via the line 18, directional control valve 7 and lines 18a,18b. The actuator 6 thus sets the tilting of the swash plate 6 by a differential pressure produced between the working fluid on the downstream side of the line 12 and that on the upstream side of the line 12 relative to the restrictor 11. The directional control valve 7 is operated by an unillustrated switching means so as to set the direction of change-over of the swash plate 5. The charge pump 4, the restrictor 11, the lines 18,19 connected respectively to the line section 18a and line section 18b located on the upstream and downstream sides of the restrictor, and the lines 18a,18b therefore constitute a working fluid feeding means for feeding the actuator 6 with the working fluid of a pressure corresponding to the revolution number of the engine 1.

The hydraulic drive circuit system is also provided with an accelerator pedal 20 as a first instructing means for instructing a target revolution number of the engine 1, an accelerator lever 21 as a second instructing means for instructing a target revolution number of the engine, operating ends 20a,21a movable in proportion to the degrees of control of the accelerator pedal 20 and accelerator lever 21 respectively, and a link plate 24 as an instruction value selecting means defining slots 22,23 with which the operating ends 20a,21a are maintained in engagement respectively.

The accelerator pedal 20 is designed to normally return to a home position by an unillustrated spring, whereas the accelerator lever 21 is held at a controlled position by means of a friction disk 25.

The link plate 24 detects by the slots 22,23 the strokes of the operating ends 20a,21a which correspond respectively to the degrees of control of the accelerator pedal 20 and accelerator lever 21, and always selects the greater stroke and then transmits the same to the engine 1. Namely, the link plate 24 always selects the greater one of target revolution numbers of the engine 1 instructed by the accelerator pedal 20 and accelerator lever 21 respectively, and then operates the engine 1 at the greater target revolution number. At this time, the accelerator pedal 20 or accelerator lever 21 instructing the smaller target revolution number can be controlled independently without affecting the other accelerator member or being affected by the other accelerator member.

The lines 18a,18b of the working fluid feeding means are connected to each other by a line 26, to which an accelerator valve 27 and on-off valve 28 are connected in series.

The operating portion 27a of the accelerator valve 27 is operated by the accelerator pedal 20, for example, by way of a linkage 29. The accelerator valve 27 is fully opened in a normal state, namely, in a state where the accelerator pedal is not depressed. As the accelerator pedal 20 is depressed progressively, the accelerator valve 27 reduces its flow passage area, namely, its opening, so as to reduce the flow rate, so that the accelerator valve 27 can control the degree of operation of the actuator 6.

The on-off valve 28 provided with the line 26 in series with the accelerator valve 27 is closed in a normal state, so that communication between lines 18a and 18b (hence, communication between lines 18 and 19) is prevented to invalidate any operation of the accelerator valve 27. For example, a switch 30 is turned on when the accelerator lever 21 is controlled. A solenoid-controlled pilot valve 28a of the on-off valve 28 is thus operated to bring the on-off valve 28 into an offset state. As a result, lines 18,19 (18a,18b) are communicated to each other via the accelerator valve 27 to permit the control of the degree of operation of the actuator 6 in accordance with the stroke of the accelerator pedal 20. The control of the accelerator lever 21 can therefore determine by way of the switch 30 and the on-off valve 28 of the solenoid-controlled pilot type whether the degree of the accelerator valve 27, namely, the actuator 6 should be controlled or not. In addition, the accelerator lever 21 can maintain the target revolution number of the engine 1 at a constant level by controlling the accelerator lever 21 to a desired position and then holding the accelerator lever 21 at that position with the friction disk 25.

The operation of the hydraulic drive circuit system according to the first embodiment will next be described.

Figure 2:
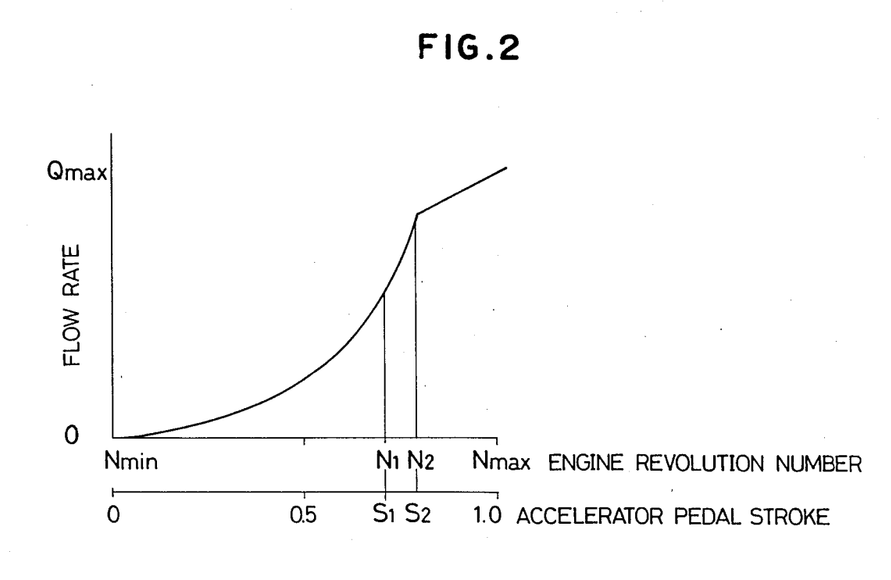
FIG. 2 is a characteristic diagram of flow rate of a hydraulic pump when an accelerator lever of the hydraulic drive circuit system of FIG. 1 has not been controlled.

When work is performed using the hydraulic drive circuit system, the work is carried out normally by depressing the accelerator pedal 20 only. Namely, when the accelerator pedal 20 is depressed, its operating end 20a is operated to shift the link plate 24 by way of the slot 22 with which the operating end 20a is maintained in engagement. The target revolution number instructed by the control of the accelerator pedal 20 is hence transmitted to the engine 1 via the link plate 24. Accordingly, the revolution number of the engine 1 increases and the delivery flow rate of the charge-pump 4 also increases, resulting in an increase in the differential pressure between the line sections 12a and 12b on the upstream and downstream sides of the restrictor 11. Since the accelerator lever 21 is not controlled at this time, the on-off valve 28 is in its closed state. The lines 18a and 18b are therefore not communicated, whereby the differential pressure produced by the restrictor 11 is transmitted to the actuator 6 independently of the position of the accelerator valve 27 so that the delivery rate of the hydraulic pump 2 changes as illustrated in FIG. 2. Namely, the delivery rate of the variable displacement hydraulic pump 2 changes as a function of the revolution number of the engine 1 and the tilting of the swash plate 5 up to a pedal stroke $S_2$ of the accelerator pedal 20, which corresponds to the maximum tilting of the swash plate 5. The flow rate Q therefore changes as a quadratic curve. Beyond the pedal stroke $S_2$, the flow rate Q is expressed as a function of only the revolution number of the engine 1 and hence increases linearly. As a result, the running speed and working speed are controlled in proportion to the stroke of the accelerator pedal.

Figure 3:
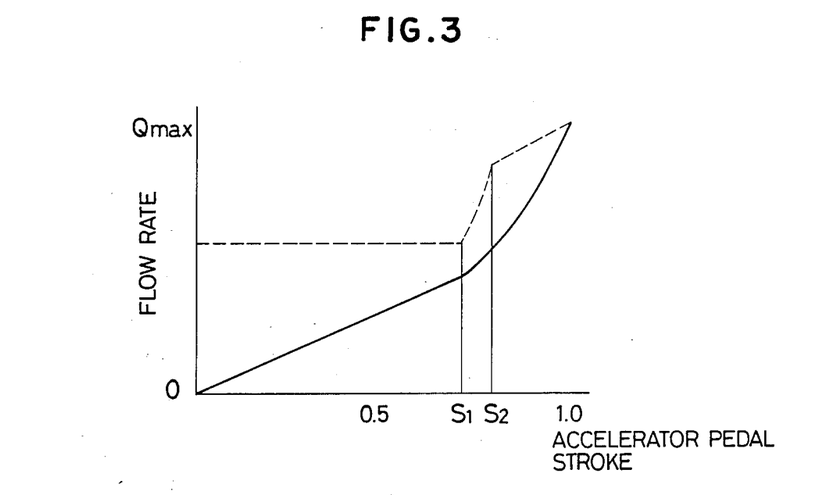
FIG. 3 is a characteristic diagram of flow rate of the hydraulic pump when the accelerator lever of the hydraulic drive circuit system of FIG. 1 has been controlled.

Let's next assume that the accelerator lever 21 is controlled in the direction indicated by arrow A and then fixed at a certain position. The degree of control of the accelerator lever 21 is hence transmitted to the link plate 24 by way of the operating end 21a and the slot 23 with which the operating end 21 is maintained in engagement, thereby controlling the revolution number of the engine 1. Representing by $N_1$ the revolution number corresponding to the degree of the control, the accelerator pedal 20 does not affect the revolution number of the engine 1 below a pedal stroke $S_1$ corresponding to the revolution number $N_1$ owing to the action of the slot 22. On the other hand, when the accelerator lever 21 is controlled, the switch 30 is turned on and the on-off valve 28 is brought into an open state. As a result, the line 18 and line 19 are communicated to each other via the accelerator valve 27 and line 26. If the stroke of the accelerator pedal 20 is 0 at this time, the accelerator valve 27 is in its fully-opened state. Since no differential pressure occurs between the line 18 and line 19, neither the actuator 6 nor the swash plate 5 is operated. Accordingly, the delivery rate from the variable displacement hydraulic pump 2 to the hydraulic motor 9, which drives the wheels 14, via the closed circuit is 0. If the accelerator pedal 20 is depressed in this state, the accelerator valve 27 is restricted by way of the linkage 29 so that the differential pressure to be transmitted to each cylinder of the actuator 6 increases. Because the degree of control of the accelerator lever 21 is maintained constant, the revolution number of the engine 1 remains constant below the pedal stroke $S_1$ of the accelerator pedal 20. The delivery rate is also supposed to remain constant as shown by a broken line in FIG. 3 where the lines 18 and 19 are not communicated to each other. The delivery rate of the variable displacement hydraulic pump 2 however changes as a function of the tilting of the swash plate below the pedal stroke $S_1$ and increases linearly as depicted by the solid line in FIG. 3, because the actuator 6 is operated via the accelerator valve 27 operated by the accelerator pedal 20; the degree of control of the accelerator pedal 20 and the degree of restriction of the accelerator valve 27 are proportional to each other.

When the degree of control of the accelerator pedal 20 exceeds the pedal stroke $S_1$, the operating end 20a is then brought into contact with the left edge of the slot 22 as viewed in FIG. 1 so that the link plate 24 is shifted by the accelerator pedal 20 to transmit the pedal stroke to the side of the engine 1. As a result, the revolution number of the engine 1 is increased further and at the same time, the opening of the accelerator valve 27 is restricted further. When the pedal stroke reaches the maximum, the accelerator valve 27 is restricted to its fully closed position. When the pedal stroke becomes greater than the pedal stroke $S_1$, the delivery rate of the variable displacement hydraulic pump 2 changes as a function of the revolution number of the engine 1 and the tilting of the swash plate 5, and hence increases as a quadratic curve. Namely, the delivery rate is proportional to the pedal stroke of the accelerator pedal 20 up to the pedal stroke $S_1$, but increases as a quadratic curve relative to the pedal stroke beyond the pedal stroke $S_1$.

According to the above-described first embodiment, the actuator 6 is not operated unless the accelerator pedal 20 is depressed, even when the working speed is set at a high speed by the accelerator lever 21. No working fluid is therefore fed from the variable displacement hydraulic pump 2 for the wheels to the hydraulic motor 9, so that the vehicle does not run. Below the revolution number set by the accelerator lever 21, the delivery rate of the variable displacement hydraulic pump 2 is proportional to the degree of control (stroke) of the accelerator pedal 20 so that the running speed can be controlled in proportion to the stroke. It is hence feasible to set the revolution number of the engine 1 constant by the accelerator lever 21 and then to control the delivery rate of the hydraulic pump 2 by the accelerator pedal 20, whereby the running speed can be controlled freely within a speed range of from a low speed to a high speed independently of the speed of work performed by the hydraulic pump 3. Owing to the above construction, the operator can control the running speed with only one foot so that the operation is simplified and the operation-related load is reduced. He can therefore easily control the lever for the front attachment, thereby permitting delicate work. If his foot should slip off the accelerator pedal 20, the vehicle is automatically stopped so that there is no danger of running the vehicle without control, and safety is ensured.

The second embodiment will next be described with reference to FIG. 4.

The second embodiment is different from the first embodiment in that the accelerator valve 27 and on-off valve 28 of the first embodiment have been replaced by a single valve, and the accelerator lever 21 is changed to a pull knob. Elements of structure which are identical to or may be regarded as identical to the corresponding elements of structure in the first embodiment will be identified by like reference numerals, and their description is omitted herein.

Figure 4:
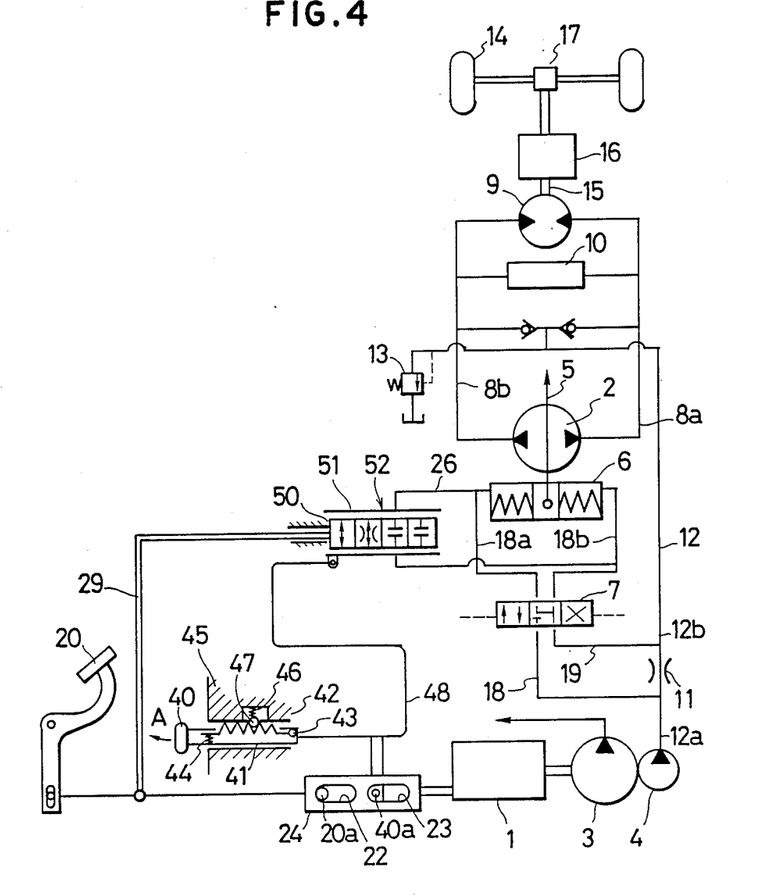
FIG. 4 is a circuit diagram showing a hydraulic drive circuit system according to a second embodiment of the present invention.

In FIG. 4, numeral 40 indicates a pull accelerator knob provided in place of the accelerator lever 21 in the first embodiment of FIG. 1. A rod 41 of the accelerator knob 40 has a serrated plate 42 adapted to position the accelerator knob 40. One end of the serrated plate 42 is pivotally supported by a pin 43 in the rod 41, while the other end of the serrate plate 42 is supported by a spring 44 which biases the serrated plate 42 in such a direction that teeth of the serrated plate 42 project out from the outer wall of the rod 41. Within a frame main body 45 in which the rod 41 is received, there is arranged a ball 47 biased by a spring 46 in such a direction that the ball 47 engages one of the teeth of the serrated plate 42. A cable 48 for transmitting the degree of control of the accelerator knob 40 is connected to the inner end of the rod 41. An operating end 40a, which is maintained in engagement with the slot 23 of the link plate 24, is connected to the cable 48.

A servo valve 52, composed of a spool 50 and a sleeve 51, is arranged in the line 26 which connects the line 18a and line 18b provided in continuation with the lines 18,19 respectively. The linkage 29 associated with the accelerator pedal 20 is connected to the spool 50, while the cable 48 associated with the accelerator knob 40 is connected to the sleeve 51. Both the spool 50 and the sleeve 51 are provided in such a way that the servo valve 52 is brought into a closed state when the stroke of the spool 50 is either equal to or greater than the stroke of the sleeve 51. But the opening of the servo valve 52 increases in accordance with the difference in stroke between the sleeve 51 and spool 50 when the stroke of the sleeve 51 is greater than that of the spool 50. Further, elements of structure not described specifically are all constructed in the same manner as in the first embodiment depicted in FIG. 1.

The hydraulic drive circuit system of the second embodiment is normally used in the following manner. When the accelerator pedal 20 is depressed, the operating end 20a is brought into the left edge of the slot 22 as viewed in FIG. 4 so that the link plate 24 is driven to transmit the degree of control of the accelerator pedal 20 to the engine 1. As a result, the revolution number of the engine 1 is increased, whereby the delivery rate of the charge pump 4 is increased. At the same time, the differential pressure between the upstream side and the downstream side of the restrictor 11 is also increased. Since the accelerator knob 40 is not controlled at this time, the servo valve 52 is closed. Accordingly, the differential pressure between the upstream side and the downstream side of the restrictor 11 is transmitted to the actuator 6 as is, and the flow rate characteristics of FIG. 2 are also shown as in the first embodiment of FIG. 1.

Let's next assume that the accelerator knob 40 is pulled in the direction indicated by arrow A and then fixed at a certain position. Here, the degree of control of the accelerator knob is transmitted from the operating end 40a to the link plate 24 via the slot 23 so as to control the revolution number of the engine 1. Representing by $N_1$ the revolution number corresponding to the degree of the control, the accelerator pedal 20 is irrelevant to the revolution number of the engine 1 below the pedal stroke $S_1$ corresponding to the engine revolution $N_1$ as in the first embodiment. On the other hand, the sleeve 51 of the servo valve 52 is operated over a stroke corresponding to the degree of control of the accelerator knob 40 by way of the cable 48, so that the serve valve 52 is brought into an open state As a result, the line sections 12a,12b on the upstream and downstream sides of the restrictor 11 are communicated to each other via the lines 18,18b,26,18b, 19. If the stroke of the accelerator pedal 20 is 0 at this time, the servo valve 52 takes its fully-opened state and no differential pressure thus occurs between the line 18 and line 19. The actuator 6 is hence not operated, nor is the swash plate 5. The delivery flow rate of the variable displacement hydraulic pump 2 is hence reduced to 0, so that the vehicle does not run.

Figure 5:
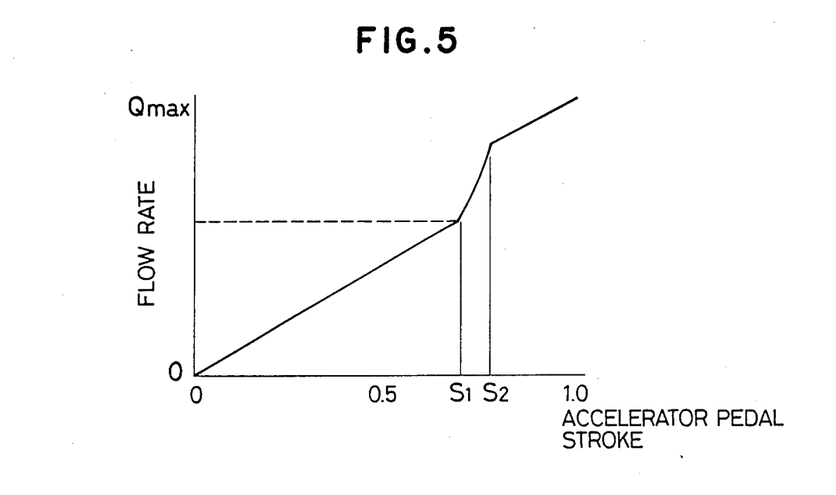
FIG. 5 is a characteristic diagram of flow rate of a hydraulic pump when an accelerator knob of the hydraulic drive circuit system of FIG. 4 has been controlled.

When the accelerator pedal 20 is depressed in this state, the stroke is transmitted to the spool 50 by way of the linkage 29 so as to shift the spool 50 in a direction closing the servo valve 52. As a consequence, a differential pressure corresponding to the stroke of the accelerator pedal 20 is supplied to the actuator 6 to operate the swash plate 5. The working fluid is hence delivered from the variable displacement hydraulic pump 2 at a flow rate proportional to the stroke as depicted in FIG. 5. When the degree of control of the accelerator pedal 20 becomes equal to the degree of control of the accelerator knob 40 (in other words, when the value of a target revolution number instructed by the accelerator pedal and that instructed by the accelerator knob 40 reach the same position, i.e., the pedal stroke $S_1$), the servo valve 52 is closed and the differential pressure produced by the restrictor 11 is supplied as is. If the accelerator pedal 20 is depressed further, the link plate 24 chooses the degree of control of the accelerator pedal 20 this time to increase the revolution number of the engine 1, so that the actuator 6 is operated further. As shown in the curve depicted in FIG. 2, the flow rate thus increases as a quadratic curve up to the pedal stroke $S_2$ corresponding to the maximum tilting of the swash plate 5 and beyond this stroke, increases linearly as a function of only the revolution number of the engine 1 as shown in FIG. 5.

In the second embodiment described above, the variable displacement hydraulic pump 2 can also provide a delivery rate proportional to the degree of control of the accelerator pedal 20 independently of the revolution number of the engine below the engine revolution number instructed by the accelerator knob 40, so that the second embodiment can bring about effects similar to those obtained by the first embodiment.

Finally, the third embodiment will be described with reference to FIGS. 6-8.

In the third embodiment, the detection means for instruction values of target revolution numbers of the engine 1 instructed respectively by the accelerator pedal 20 and the accelerator lever 21 or accelerator knob 40; the instruction value selecting means for selecting the greater one of the instruction values detected by the detection means and transmitting same to the engine 1; and the control means for controlling the valve means provided with the line 26 in the first and second embodiments, are composed of electrical means respectively. Elements of structure, which are identical or may be regarded to be identical to their corresponding elements in the hydraulic drive circuits systems according to the first and second embodiments, will be identified by like reference numerals, and the description of such common elements is omitted herein.

Figure 6:
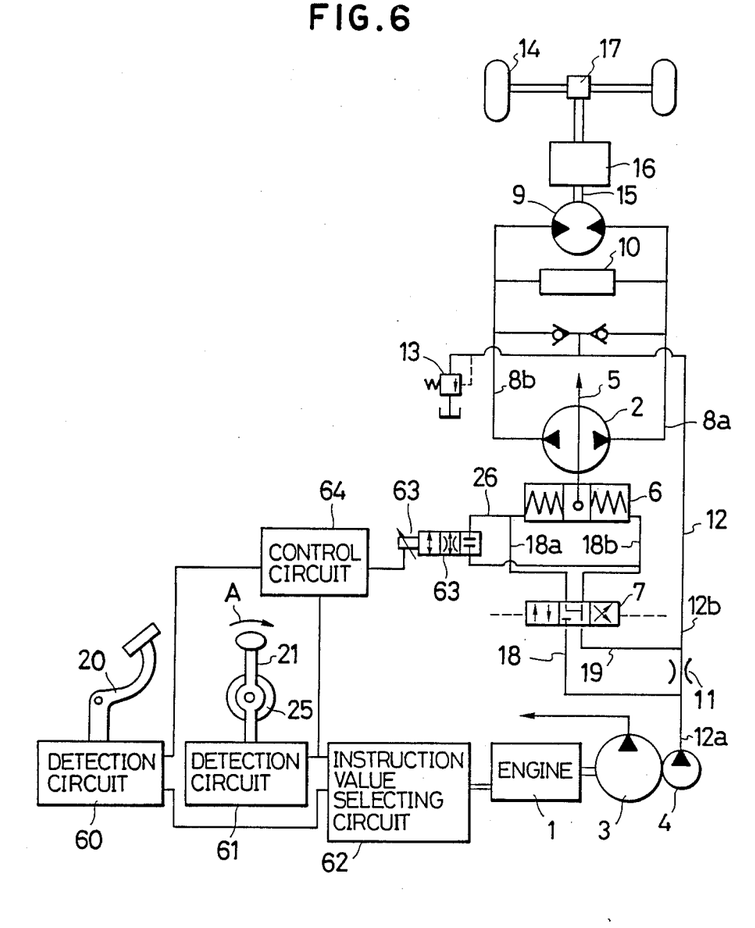
FIG. 6 is a circuit diagram showing a hydraulic drive circuit system according to a third embodiment of the present invention.

In FIG. 6, the accelerator pedal 20 is provided with an instruction value detecting circuit 60 for detecting the instruction value of the target revolution number of the engine 1 from the degree of control of the accelerator pedal 20. The accelerator lever 21 is also provided with a similar instruction value detecting circuit 61. Provided between these instruction value detecting circuits 60,61 and the engine 1 is an instruction value selecting circuit 62 which selects the greater one of instruction values of target revolution numbers of the engine 1 instructed respectively by the accelerator pedal 20 and accelerator lever 21. Between both instruction value detecting circuits 60,61 and a solenoid-controlled proportional valve 63 provided as a valve means in the line 26, there is provided a control circuit 64 for the solenoid-controlled proportional valve 63. The control circuit 64 detects whether the accelerator lever 21 has been controlled or not, and when the accelerator lever 21 has been controlled, outputs to a solenoid-controlled pilot portion 63a a current corresponding to the instruction value instructed by the accelerator pedal 20.

Figure 7:
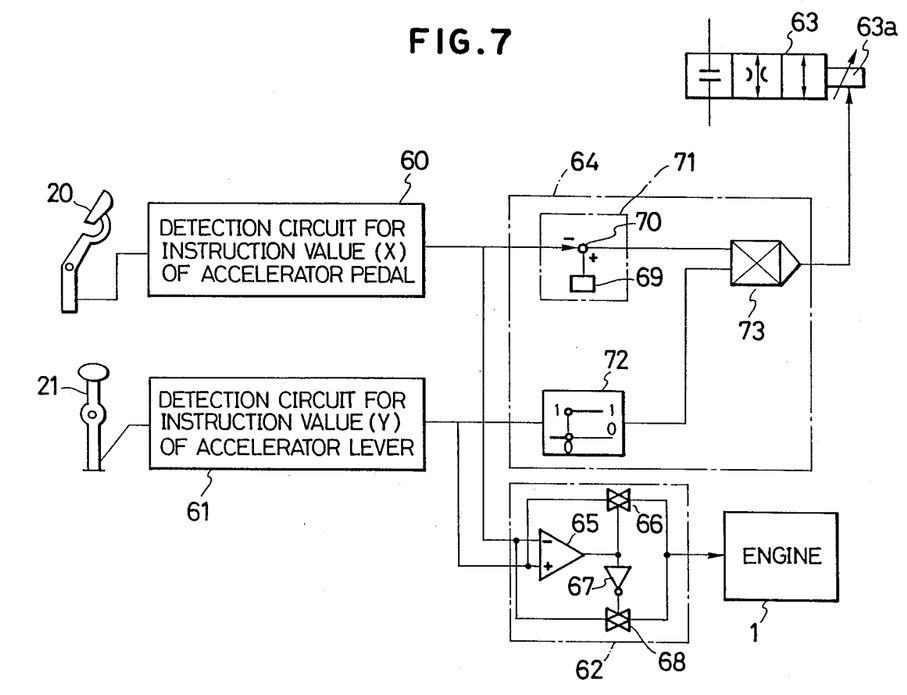
FIG. 7 is a block diagram showing the specific construction of an instruction value selecting circuit and a control circuit in the hydraulic drive circuit system of FIG. 6.
Figure 8:
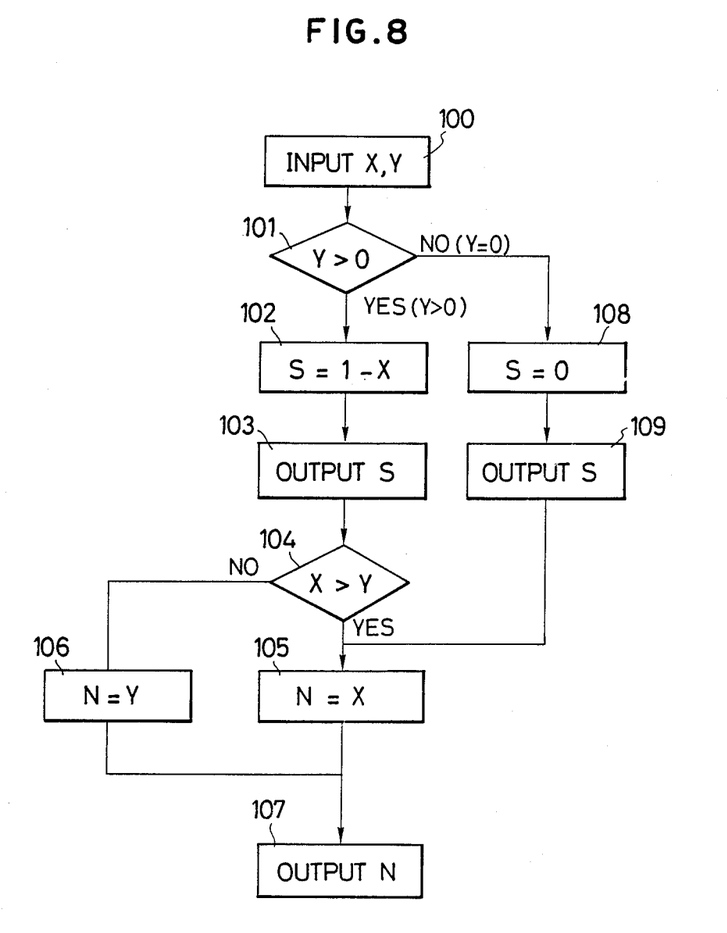
FIG. 8 is a flow chart showing a routine when the instruction value selecting circuit and control circuit have been constructed by a microcomputer.

As illustrated in FIG. 7 by way of example, the instruction value selecting circuit 62 is composed of a comparator 65, a switch 66 and another switch 68. The comparator 65 receives instruction values X,Y from the accelerator pedal 20 and accelerator lever 21 respectively and compares them to each other. The comparator 65 outputs 1 when $X \leq Y$ but $-1$ when $X > Y$. The switch 66 is connected directly to the comparator 65 and is turned on by the signal 1, while the switch 68 is connected to the comparator 65 via a reversing circuit 65 and is turned on by the signal 1. The switches 66,68 are connected commonly to the transmission line of the instruction values X,Y to the engine 1. When the instruction value X of the accelerator pedal 20 is either equal to or smaller than the instruction value Y of the accelerator lever 21 ($X \leq Y$), the comparator 65 outputs 1 to turn on the switch 66 so that the instruction value Y is transmitted to the engine 1. Namely, the instruction value Y either equal to or greater than the instruction value X is selected. On the contrary, when the instruction value X of the accelerator pedal 20 is greater than the instruction value Y of the accelerator lever 21 ($X > Y$), the comparator 65 outputs $-1$. This signal $-1$ is then reversed to 1 by the reversing circuit 67 to turn on the switch 68. As a consequence, the greater instruction value X is also transmitted to the engine 1.

On the other hand, the control circuit 64 is composed of a computing circuit 71, a function generator 72 and a multiplication circuit 73. The computing circuit 71 is constructed of a setting unit 69, in which the maximum instruction value 1 of the accelerator has been set in advance, and a subtracter 70 for computing the difference $(1-X)$ between the instruction value X of the accelerator pedal 20 and the maximum instruction value 1 of the setting unit 69. The function generator 72 outputs 0 when the instruction value Y of the accelerator lever 21 is 0 ($Y=0$) but 1 when $Y > 0$. On the other hand, the multiplication circuit 73 multiplies an output from the computing circuit 71 by an output from the function generator 72. An output from the multiplication circuit 73 is converted to a current value, which is thereafter delivered to the solenoid-controlled pilot portion 63a of the solenoid-controlled proportional valve 63.

In the control circuit 64, the function generator 72 confirms whether or not the instruction value Y of the accelerator lever 21 instructing the target revolution number of the engine has been detected by the accelerator lever instruction value 0 detection circuit 61, whereby the function generator 72 determines whether the computing circuit 71 may or may not output a signal. Namely, it is judged by the function generator 72 whether the instruction value Y is zero or positive. When the accelerator lever 21 has not been controlled, namely, when the instruction value Y is 0, the function generator 72 outputs 0 to the multiplication circuit 73. As a consequence, the output of the multiplication circuit 73 is converted to zero irrespective of the instruction value X of the accelerator pedal 20 and the control of the accelerator pedal 20 is cancelled in its entirety in connection with the control of the solenoid-controlled proportional valve 63. When the accelerator lever 21 is controlled even over the smallest stroke, the instruction value Y of the accelerator lever 21 is detected by the function generator 72. The function generator 72 always outputs the value 1 to the multiplication circuit 73 when the instruction value Y is positive. When the accelerator lever 21 is in a state controlled even over the smallest stroke, the output $(1-X)$ of the computing circuit 71 is converted as is into a current value, and the current value is then outputted to the solenoid-controlled pilot portion 63a of the solenoid-controlled proportional valve 63. Although the function generator 72 is designed to output 1 whenever the accelerator lever 21 is controlled even over the smallest stroke, the correlation between the output of the function generator 72 and the degree of control of the accelerator lever 21 may obviously be set at will depending on the kind of the drive circuit or the type of work. Elements of structures not described specifically are all constructed in the same manner as in the first and second embodiments.

When an electrical means such as that described above is employed and only the accelerator pedal 20 is controlled without control of the accelerator lever 21, the instruction value X of the accelerator pedal 20 is selected by the instruction value selecting circuit 62 and the engine 1 rotates faster in accordance with the revolution number corresponding to the instruction value X. At the same time, the delivery rate of the charge pump 4 is increased, the differential pressure between the upstream side and downstream side of the restrictor 11 is increased, and the tilting of the swash plate 5 is hence increased via the actuator 6. As a consequence, the hydraulic control circuit system exhibits the same flow rate characteristics as those illustrated diagrammatically in FIG. 2.

When only the accelerator lever 21 is controlled without controlling the accelerator pedal 20, the revolution number of the engine 1 increases in accordance with the instruction value Y instructed by the degree of control of the accelerator lever 21 and the delivery rate of the charge pump 4 also increases. A signal instructing full opening is however sent out from the control circuit 64 to the solenoid-controlled proportional valve 63 because the instruction value X is 0. As a result, the lines 18 and 19 are communicated to each other and no differential pressure occurs between the upstream side and downstream side of the restrictor 11. The actuator 6 is hence not operated and the swash plate 5 is not tilted. Accordingly, no working fluid is delivered from the variable displacement hydraulic pump 2.

Let's next assume that the accelerator pedal 20 is controlled when the accelerator lever 21 has been controlled and is held at the constant instruction value Y. In this case, the flow rate increases linearly in proportion to the stroke of the accelerator pedal 20 until the instruction value Y of the accelerator lever 21 and the instruction value X of the accelerator pedal 20 become equal to each other. When the instruction value X becomes greater than the instruction value Y, the revolution number of the engine increases in accordance with the stroke of the accelerator pedal 20 and the delivery rate of the charge pump 4 also increases. At the same time, the opening of the solenoid-controlled proportional valve 63 becomes smaller in accordance with the computing equation $(1-X)$, so that the differential pressure to be applied to the actuator 6 also increases. As a consequence, the tilting of the swash plate 5 also increases and the delivery rate of the variable displacement hydraulic pump 2 increases as a quadratic curve to show similar flow rate characteristics as that obtained by the first embodiment described above.

The above characteristics are similar to those obtained by the first embodiment, since the computing equation (1−X) is employed in the computing circuit 1. A hydraulic drive circuit equipped a wide variety of characteristics may be used provided that the setting of the computing equation is changed.

Because the third embodiment shows characteristics similar to those exhibited by the first embodiment, the third embodiment can bring about similar effects to those achieved by the first embodiment. In addition, the use of the electric means allows one to set the characteristics rather freely, so that the operator can choose characteristics suitable for the type of work being performed. Accordingly, the operation can be further simplified.

The instruction value selecting circuit 62 and control circuit 64 are composed of electronic circuits in the third embodiment; the processings performed by these circuits may be conducted using a microcomputer. FIG. 8 shows a routine for such processings as a flow chart.

First of all, the instruction values, X and Y, of the accelerator pedal 20 and accelerator lever 21 are inputted in Step 100. The routine then advances to Step 101, where it is judged whether Y is positive or not. When Y is positive (namely, when the accelerator lever 21 has been controlled), the routine advances to Step 102 where S=1−X is computed. S is then outputted to the solenoid-controlled proportional valve 3 in Step 103. As a result, the opening of the solenoid-controlled proportional valve 63 is reduced in accordance with the computing equation (1−X), the differential pressure applied to the actuator 6 becomes greater, and the delivery rate of the hydraulic pump 2 can also be controlled by virtue of the tilting of the swash plate of the hydraulic pump 2. A judgement is next made in Step 104 to determine which one of the instruction values, X or Y, is greater. When X>Y, N=X is computed in Step 105. When X≦Y, N=Y is computed in Step 106. As a result, the greater one of the instruction values X,Y is selected as the value of N. N is thereafter outputted to the engine 1 in Step 107 so as to control the revolution number of the engine 1 in accordance with the greater one of the instruction values X,Y.

On the contrary, when the instruction value Y is judged not to be positive in Step 101, the routine advances to Step 108 where S=0 is computed. S is then outputted to the solenoid-controlled proportional valve 63 in Step 109. Namely, when the instruction value Y is not positive, it means that the accelerator lever 21 has not been controlled. In this case, it is possible to control the tilting of the swash plate of the hydraulic pump 2 by controlling the accelerator pedal 20 while maintaining the solenoid-controlled proportional valve 63 in its closed position. The routine then advances to Step 105 where N=X is computed, and the instruction value X of the accelerator pedal 20 is then outputted to the engine 1 in Step 107.

It will be understood that the use of such a microcomputer can bring about similar effects and advantages as the third embodiment making use of the electronic circuits.

When the revolution of the engine has been set at a desired revolution number by the second instructing means in the present invention, the control of the degree of operation of the actuator can be performed at an engine revolution number smaller than the desired revolution number by the first instructing means via the valve means, independently of the revolution number of the engine as has been described above. The operation has hence been simplified, thereby making it possible to easily perform even delicate work. Owing to the improved operability and simplified operation, the load on the operator can be reduced. Since the actuator is not driven unless an instruction value is outputted by the first instructing means, no working fluid is delivered from the variable displacement hydraulic pump so long as the first instructing means is not controlled. The hydraulic drive circuit system is hence safe. Coupled with the reduced load on the operator, safety has been improved. While carrying out one work by the second instructing means, other work can also be performed independently of the first by controlling the speed of the second in a wide range of from a low speed to a high speed through the first instructing means.

We claim:

1. A hydraulic drive circuit system equipped with an engine, a plurality of hydraulic pumps adapted to be driven by the engine, one of said hydraulic pumps being a variable displacement hydraulic pump provided with a displacement varying mechanism, a hydraulic actuator for actuating the displacement varying mechanism of the variable displacement hydraulic pump, a working fluid feeding means for feeding the hydraulic actuator with a working fluid of a pressure corresponding to the revolution number of the engine, and a valve means connected to a line, which is interposed between the working fluid feeding means and a low pressure source, and adapted to vary the flow passage area of the line to control the degree of actuation of the hydraulic actuator, which comprises:
   first and second instruction means for respectively instructing target revolution numbers for the engine;
   an instruction value selecting means for selecting the greater one of the instruction values from the first and second instruction means; and
   a control means for controlling the valve means so as to close the flow passage of the line irrespective of the instruction value of the first instruction means when the second instructing means has not been controlled but for controlling the valve means so as to restrict the flow passage of the line in accordance with the instruction value of the first instructing means when the second instructing means has been controlled.

2. The hydraulic drive circuit system as claimed in claim 1, wherein the valve means has a flow rate control valve and an on-off valve, both, connected in series with the line, and the control means comprises a first control means for restricting the opening of the flow rate control valve to control the flow passage of the line in accordance with the instruction value of the first instructing means and a second control means for closing the on-off valve when the instruction value of the second instructing means is zero but for opening the on-off valve when the instruction value of the second instructing means is other than zero.

3. The hydraulic drive circuit system as claimed in claim 1, wherein the valve means comprises a servo valve equipped with a spool and a sleeve, the servo valve takes a closed state when the stroke of the spool is at least the same as the stroke of the sleeve but the opening of the servo valve increases in accordance with a difference in stroke between the sleeve and spool when the stroke of the sleeve is greater than the stroke of the spool, and the control means comprises a first control means for varying the stroke of the spool of the servo valve in accordance with the instruction value of the first instructing means and a second control means for varying the stroke of the sleeve of the servo valve in accordance with the instruction value of the second instructing means.

4. The hydraulic drive circuit system as claimed in claim 1, wherein the valve means is a solenoid-controlled proportional valve, and the control means comprises a means for discriminating whether the instruction value of the second instructing means is zero or not and a means for closing the solenoid-controlled valve irrespective of the instruction value of the first instructing means when the instruction value of the second instruction means has been found to be zero by the discriminating means but for controlling the opening of the solenoid-controlled proportional valve in accordance with the instruction value of the first instructing means when the instruction value of the second instructing means has been found to be other than zero by the discriminating means.

5. The hydraulic drive circuit system as claimed in claim 1, wherein the instruction value selecting means comprises a link plate defining a first slot to which an operating end of the first instructing means is connected and a second slot to which an operating end of the second instructing means is connected.

6. The hydraulic drive circuit system as claimed in claim 1, wherein the instruction value selecting means comprises a means for comparing the instruction value of the first instructing means and the instructing value of the second instructing means to determine which instruction value is greater and a means for outputting the greater instruction value on the basis of the comparison by the comparing means.

7. The hydraulic drive circuit system as claimed in claim 1, wherein the second instructing means has a means for holding the second instructing means at a controlled position.

* * * * *